United States Patent
Oda et al.

(10) Patent No.: US 9,850,836 B2
(45) Date of Patent: Dec. 26, 2017

(54) AUTOMATIC CONTROL APPARATUS FOR ENGINE

(71) Applicant: TOYOTA JIDOSHA KABUSHIKI KAISHA, Toyota-shi (JP)

(72) Inventors: Yasutaka Oda, Nagoya (JP); Hiroaki Tabuchi, Okazaki (JP); Yu Sakai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/123,496

(22) PCT Filed: Feb. 27, 2015

(86) PCT No.: PCT/IB2015/000244
§ 371 (c)(1),
(2) Date: Sep. 2, 2016

(87) PCT Pub. No.: WO2015/132643
PCT Pub. Date: Sep. 11, 2015

(65) Prior Publication Data
US 2017/0074189 A1    Mar. 16, 2017

(30) Foreign Application Priority Data
Mar. 3, 2014    (JP) .................. 2014-040869

(51) Int. Cl.
*B60W 10/06*    (2006.01)
*F02D 41/02*    (2006.01)
(Continued)

(52) U.S. Cl.
CPC ......... *F02D 41/0225* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 5,653,659 A  * | 8/1997 | Kunibe | ................. | B60W 10/02 |
| | | | | 477/110 |
| 6,885,113 B2 * | 4/2005 | Lim | ....................... | B60K 6/485 |
| | | | | 290/40 A |

(Continued)

FOREIGN PATENT DOCUMENTS

DE    10 2012 217 076 A1    4/2013
DE    10 2012 201 113 A1    5/2013
(Continued)

OTHER PUBLICATIONS

International Search Report dated Jun. 22, 2015, in PCT/IB2015/000244 filed Feb. 27, 2015.

*Primary Examiner* — Dirk Wright
(74) *Attorney, Agent, or Firm* — Oblon, McClelland, Maier & Neustadt, L.L.P.

(57) ABSTRACT

An automatic control apparatus for an engine detects an operation position of a mechanical shift lever for shifting gears of a transmission, automatically stops the engine when a predetermined condition is satisfied in the case where the operation position is at a first specific range, and automatically restarts the engine in the case where, after the operation position is switched from the first specific range to a second specific range while the engine is stopped, the second specific range is maintained for a predetermined time. When the operation position is switched from the first specific range to the second specific range while the engine is stopped, it is determined whether or not the driver has an intention to start the vehicle, and if YES, the predetermined (Continued)

time is set to be shorter than when it is determined that there is no intention to start the vehicle.

7 Claims, 3 Drawing Sheets

(51) Int. Cl.
| | |
|---|---|
| *B60W 10/10* | (2012.01) |
| *B60W 30/18* | (2012.01) |
| *F02N 11/08* | (2006.01) |
| *F02D 41/04* | (2006.01) |
| *F02D 41/06* | (2006.01) |
| *F02D 41/22* | (2006.01) |
| *F16H 63/50* | (2006.01) |
| *F16H 59/08* | (2006.01) |

(52) U.S. Cl.
CPC ..... *B60W 30/18018* (2013.01); *F02D 41/042* (2013.01); *F02D 41/065* (2013.01); *F02D 41/22* (2013.01); *F02N 11/0822* (2013.01); *F16H 63/50* (2013.01); *B60W 2540/18* (2013.01); *F02D 2200/60* (2013.01); *F02N 2200/0802* (2013.01); *F02N 2200/0803* (2013.01); *F02N 2200/0808* (2013.01); *F02N 2200/104* (2013.01); *F02N 2300/2011* (2013.01); *F16H 59/08* (2013.01); *F16H 2312/14* (2013.01); *Y02T 10/48* (2013.01)

(56) References Cited

U.S. PATENT DOCUMENTS

| | | | |
|---|---|---|---|
| 8,308,607 B2* | 11/2012 | Christen | B60W 30/18018 477/73 |
| 8,690,731 B1* | 4/2014 | Sangameswaran | F02N 11/0822 477/111 |
| 8,702,563 B1* | 4/2014 | Sangameswaran | B60W 10/06 477/111 |
| 8,897,990 B2* | 11/2014 | Kim | F02N 11/0833 123/179.4 |
| 9,056,606 B1* | 6/2015 | Rademacher | B60W 10/06 |
| 9,291,118 B2* | 3/2016 | Kokon | F02D 29/02 |
| 9,416,742 B2* | 8/2016 | Gibson | F02D 41/0087 |
| 9,464,715 B2* | 10/2016 | Kawamoto | F02D 17/00 |
| 2004/0046394 A1 | 3/2004 | Lim | |
| 2013/0158838 A1* | 6/2013 | Yorke | B60W 10/06 701/103 |
| 2013/0158843 A1 | 6/2013 | Kokon et al. | |

FOREIGN PATENT DOCUMENTS

| | | |
|---|---|---|
| DE | 20 2013 003 647 U1 | 7/2013 |
| JP | 10077937 A | 3/1998 |
| JP | 10-184885 A | 7/1998 |
| JP | 2004-360465 A | 12/2004 |
| JP | 2008-25590 A | 2/2008 |
| JP | 2012-52471 A | 3/2012 |
| JP | 2012-87730 A | 5/2012 |

* cited by examiner

| SHIFT RANGE | IDLING STOP POSSIBLE OR NOT |
|---|---|
| P | ○ |
| R | × |
| N | × |
| D | ○ |

FIG. 4

|  | TN | TR |
|---|---|---|
| HAZARD WARNING LAMP SW = ON | 0 | 0 |
| STEERING ANGLE ≥ Y1 | 0 | 0 |
| STEERING TORQUE ≥ Y2 | 0 | 0 |
| STAY TIME AT D RANGE < X1 | B | B |
| STAY TIME AT D RANGE ≥ X2 | B | B |
| OTHER THAN THOSE ABOVE | A | A |

AUTOMATIC CONTROL APPARATUS FOR ENGINE

BACKGROUND OF THE INVENTION

1. Field of the Invention

The present invention relates to an automatic control apparatus for an engine, and in particularly, to an automatic control apparatus for an engine which is capable of performing idling stop to enable the engine to be automatically stopped and idling start to enable the engine to be automatically restarted according to an operation position of a mechanical shift lever which is a shift lever operated by a driver to switch shift stages of a transmission between a plurality of shift ranges.

2. Description of Related Art

An automatic control apparatus for an engine is known, which detects an operation position of a mechanical shift lever that is operated by the driver to switch shift stages of a transmission between a plurality of shift ranges, and performs idling stop to enable the engine to be automatically stopped and idling start to enable the engine to be automatically restarted according the operation position (for example, refer to Japanese Patent Application Publication No. JP 10-77937 (JP 10-77937A)).

With the automatic control apparatus for an engine as described in the above JP 10-77937A, after the operation position of the mechanical shift lever is switched to the Reverse range while the engine is stopped by the idling stop, in the case where the operation position is maintained at the Reverse range for a certain predetermined time, the engine is restarted by the idling start. In this configuration, if the operation position is not maintained at the Reverse range for the predetermined time, the engine is continuously stopped by the idling stop; on the other hand, if the operation position is maintained at the Reverse range for the predetermined time, the stop state of the engine achieved by the idling stop is released by the idling start, and the engine is restarted.

Therefore, according to the above automatic control apparatus for an engine, it is possible not only to suppress the fuel consumption of the engine by means of the idling stop, but also to ensure the vehicle to be started smoothly by means of the idling start. In addition, when the operation position of the mechanical shift lever only passes by the Reverse range while the engine is stopped by the idling stop, in the case where the driver switches the operation position of the mechanical shift lever for example from the Drive range to the Park range, it is possible to prevent the engine from being mistakenly restarted, and therefore, the fuel economy of the engine can be improved.

However, as mentioned above, the engine which has been stopped by the idling stop can be restarted by the idling start only after the operation position of the mechanical shift lever is maintained at the Reverse range for a constant certain time, so, for example, when the driver has the intention to immediately start the vehicle which is in the idling stop, when the operation speed of the mechanical shift lever varies for different drivers, and so on, sometimes, the driver would feel that the vehicle has poor start response.

SUMMARY OF THE INVENTION

The present invention provides an automatic control apparatus for an engine, which is capable of appropriately restarting the engine that has been stopped by the idling stop by means of the idling start in compliance with the driver's intention to start the vehicle and/or the shift lever operation.

A first aspect of the present invention relates to an automatic control apparatus for an engine. The automatic control apparatus for an engine includes: an operation position detection portion that is equipped on a vehicle with a mechanical shift lever, which is operated by the driver to switch shift stages of a transmission between a plurality of shift ranges, to detect an operation position of the mechanical shift lever; an idling stop control portion that performs an idling stop function to enable the engine to be automatically stopped if a predetermined condition is satisfied in the case where the operation position of the mechanical shift lever is located at a first specific range as a part of all the shift ranges, and that performs an idling start function to enable the engine to be automatically restarted in the case where, after the operation position of the mechanical shift lever is switched from the first specific range to a second specific range different from the first specific range while the engine is stopped by the idling stop function, the operation position of the mechanical shift lever is maintained at the second specific range for a predetermined time; a start intention determination portion that determines whether or not the driver has an intention to start the vehicle when the operation position of the mechanical shift lever is switched from the first specific range to the second specific range while the engine is stopped by the idling stop function; and a time variation portion that sets the predetermined time to be shorter in the case where the start intention determination portion determines that the driver has the intention to start the vehicle than when it is determined that there is no intention to start the vehicle.

A second aspect of the present invention relates to an automatic control apparatus for an engine. The automatic control apparatus for an engine includes: an operation position detection portion that is equipped on a vehicle with a mechanical shift lever, which is operated by the driver to switch shift stages of a transmission between a plurality of shift ranges, to detect an operation position of the mechanical shift lever; an idling stop control portion that performs an idling stop function to enable the engine to be automatically stopped if a predetermined condition is satisfied in the case where the operation position of the mechanical shift lever is located at a first specific range as a part of all the shift ranges, and that performs an idling start function to enable the engine to be automatically restarted in the case where, after the operation position of the mechanical shift lever is switched from the first specific range to a second specific range different from the first specific range while the engine is stopped by the idling stop function, the operation position of the mechanical shift lever is maintained at the second specific range for a predetermined time; an operation speed detection portion that detects an operation speed of the mechanical shift lever when the operation position of the mechanical shift lever is switched from the first specific range to the second specific range while the engine is stopped by the idling stop function; and a time variation portion that varies the predetermined time according to the operation speed detected by the operation speed detection portion.

With the above aspects, the engine which has been stopped by the idling stop function can be appropriately restarted by means of the idling start function in compliance with the driver's intention to start the vehicle and/or the shift lever operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a diagram of an exemplary relationship between a vehicle state and a predetermined time, showing that the predetermined time with respect to the operation position of the shift lever in the automatic control apparatus for an engine of the present embodiment is varied with the vehicle state.

DETAILED DESCRIPTION OF EMBODIMENTS

Hereinafter, a specific embodiment of the automatic control apparatus for an engine according to the present invention will be described by using the attached drawings.

Figures 1, 2:
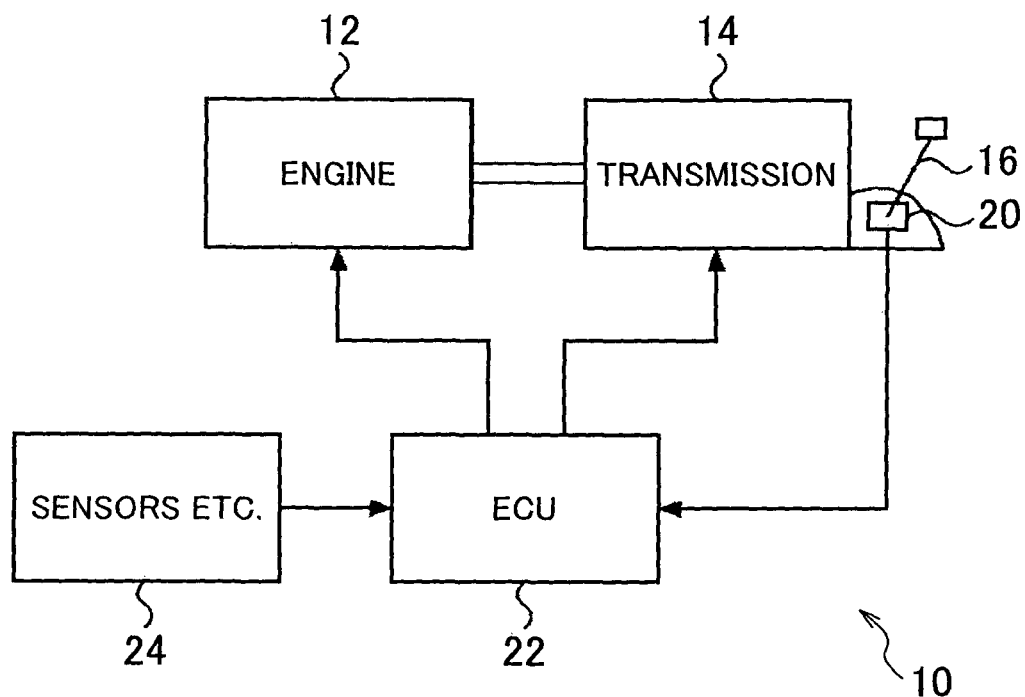
FIG. 1 is a structural diagram of a system with an automatic control apparatus for an engine according to an embodiment of the present invention.
FIG. 2 is a diagram showing whether or not an idling stop is executable for each of the shift ranges in the automatic control apparatus for an engine of the present embodiment.

FIG. 1 is a structural diagram of a system with an automatic control apparatus 10 for an engine according to an embodiment of the present invention. In addition, FIG. 2 is a view showing whether or not an idling stop is executable for each of the shift ranges in the automatic control apparatus 10 for an engine of the present embodiment.

The automatic control apparatus 10 for an engine according to the present embodiment is as follows: while a vehicle is stopped before a traffic light, for example, in the case where an engine 12 equipped on the vehicle reaches an idling state, an idling stop will be performed to enable the engine 12 to be automatically stopped; and after the engine is stopped, in the case where the idling state is released, an idling start is performed to enable the engine 12 to be automatically restarted.

The engine 12 generates a driving force to drive the vehicle, by supplying fuel to the engine 12 according to an accelerator operation by the driver of the vehicle and igniting the fuel. An output shaft of the engine 12 is connected with an input shaft of a transmission 14 via a hydraulic coupling. An output shaft of the transmission 14 is connected with wheels as driving wheels. The driving force generated by the engine 12 is transmitted to the driving wheels via the transmission 14.

The transmission 14 includes a plurality of gears and clutches for suitably connecting the gears with each other according to a switching of shift stages. The transmission 14 is configured as an automatic transmission capable of switching the shift stages between a plurality of shift ranges and being selected at any one of the shift ranges. The plurality of shift ranges of the transmission 14 are, for example, six shift ranges of Park range (P range), Reverse range (R range), Neutral range (N range), Drive range (D range), Second range (2nd range), and Low range (1st range).

The shift stages of the transmission 14 are switched between the above shift ranges by the driver's operation on a mechanical shift lever (hereinafter, simply referred to as shift lever) 16. The operation positions of the shift lever 16 are arranged in the order of P range, R range, N range, D range, 2nd range and 1st range of the above six shift ranges. The shift lever 16 can be moved to any operation position between the P range and the 1st range which are respectively located at both ends.

The automatic control apparatus 10 for an engine is equipped with a position sensor 20. The position sensor 20 is a group of switches that outputs a signal corresponding to the range selected from all the shift ranges by the driver's operation on the shift lever 16, i.e. the operation position of the shift lever 16. The position sensor 20 outputs a signal corresponding to any range selected from all the shift ranges.

The position sensor 20 is electrically connected with an electronic control unit (hereinafter, referred as to ECU) 22 which is constructed by a microcomputer as a main body. The output signal from the position sensor 20 is supplied to the ECU 22. The ECU 22 detects the operation position of the shift lever 16 based on the output signal from the position sensor 20, and determines which range of all the shift ranges the current operation position is located at.

In addition to the above position sensor 20, the ECU 22 is further electrically connected with various sensors etc. 24 used for performing the idling stop and the idling start. The sensors etc. 24 include, for example, an enable/disable switch operated by the driver to permit or prohibit the execution of the idling stop and the idling start of the engine 12, a throttle opening sensor for detecting an opening degree of a throttle, an idling switch for detecting a full-closed state of the throttle, a vehicle speed sensor for detecting the speed of the vehicle, a parking brake switch for detecting the operated state of a parking brake, a service brake switch for detecting the depression of a brake pedal, a sensor for detecting the operation state of an air conditioner, a sensor for detecting the remaining capacity of an on-board battery, a sensor for detecting the temperature of a coolant of the engine 12, a hazard warning lamp switch for turning on/off a hazard warning lamp, an angle sensor for detecting a steering angle, a torque sensor for detecting a steering torque, and so on.

The ECU 22 detects various states of the host vehicle (including whether or not the engine 12 is in the idling state) based on the signals from the sensors etc. 24. The ECU 22 is electrically connected with the engine 12 and the transmission 14. The ECU 22 controls the driving of the engine 12 based on the state detection results obtained by using the sensors etc. 24, and switches the shift stages of the transmission 14 based on the state detection results obtained by using the sensors etc. 24 and the operation position of the shift lever 16 obtained by using the position sensor 20. For example, in the case where the shift lever 16 is operated to the R range, the shift stage of the transmission 14 is set as R range.

In addition, based on the state detection results obtained by using the sensors etc. 24 and the operation position of the shift lever 16 obtained by using the above position sensor 20, the ECU 22 determines whether or not a condition for performing the idling stop to enable the engine 12 to be automatically stopped is satisfied, and after the execution of the idling stop is started, determines whether or not a condition for performing the idling start to enable the engine 12 to be automatically restarted is satisfied.

The execution conditions for the idling stop are that the operation position of the shift lever 16 is in the D range or the P range, and the engine 12 is in the idling state, for example, the vehicle speed is low or is about zero, the parking brake is operated, the brake pedal is depressed, the air conditioner is not in operation, the remaining capacity of the battery is sufficient, the temperature of the engine coolant is at a suitable temperature, and so on.

In addition, the execution conditions for the idling start are that the operation position of the shift lever 16 is in the N range or the R range, or the engine 12 is not in idling state, for example, the vehicle speed is not low or the vehicle speed is not zero, the operation of the parking brake is released, the depression on the brake pedal is released, the air conditioner is in operation, the remaining capacity of the battery is insufficient, or the temperature of the engine coolant is not at a suitable temperature, and so on.

In addition, as mentioned above, the operation positions of the shift lever 16 are arranged in the order of P range, R range, N range, D range, 2nd range and 1st range of the six shift ranges. Furthermore, the D range and P range are set as the operation positions as one of the execution conditions for the idling stop, and the N range and the R range located between the D range and the P range are set as the operation positions as one of the execution conditions for the idling start. That is, the arrangement sequence of all the operation positions of the shift lever 16 is configured in such a manner that the shift ranges (in particular, the N range and the R range) for which the idling start is executable are interposed between two shift ranges (in particular, the D range and the P range) for which the idling stop is executable.

Figure 3:
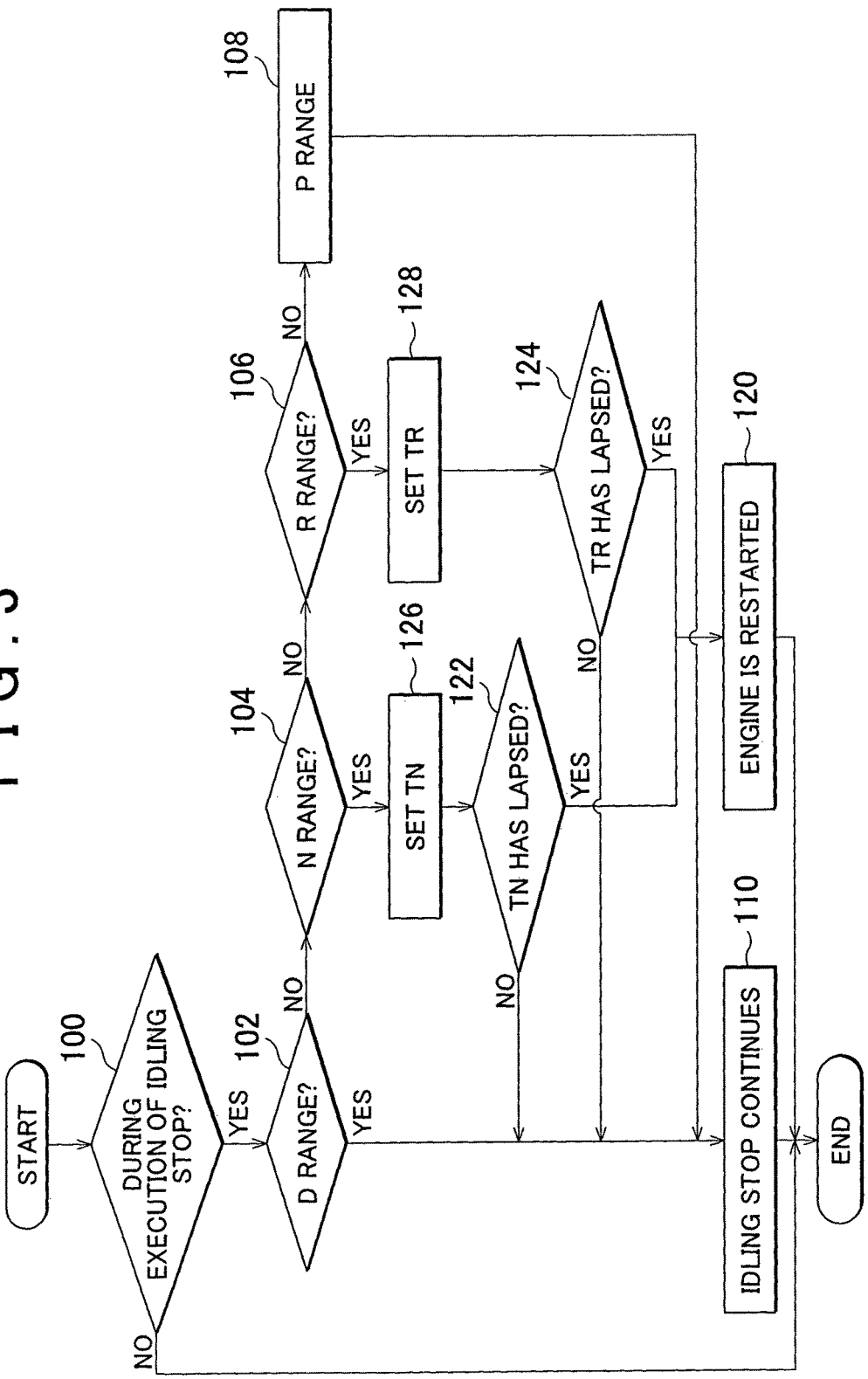
FIG. 3 is a flowchart of an example of a control routine performed in the automatic control apparatus for an engine of the present embodiment.

Next, referring to FIG. 3 and FIG. 4, the action of the automatic control apparatus 10 for an engine will be described. FIG. 3 is a flowchart showing an example of the control routine executed by the ECU 22 in the automatic control apparatus 10 for an engine of the present embodiment. In addition, FIG. 4 is a diagram of an exemplary relationship between a vehicle state and a predetermined time T, showing that the predetermined time T with respect to the operation position of the shift lever 16 in the automatic control apparatus 10 for an engine of the present embodiment is varied with the vehicle state.

In the present embodiment, after the engine 12 is started, the ECU 22 determines whether or not an execution condition for the idling stop enabling the engine to be automatically stopped is satisfied, based on the state detection results obtained by using the sensors etc. 24 and the operation position of the shift lever 16 obtained by using the position sensor 20. As a result, in the case where it is determined that the execution condition for the idling stop is not satisfied, the process thereafter is ended. On the other hand, in the case where it is determined that the execution condition for the idling stop is satisfied, including the operation position of the shift lever 16 being at the D range or the P range, the idling stop is performed to enable the engine 12 to be automatically stopped.

Therefore, according to the present embodiment, after the engine 12 is started, when an execution condition for the idling stop, such as the shift stage of the transmission 14 is at the D range or the P range and the engine 12 is in the idling state, and so on, is satisfied, fuel supply to the engine 12 can be stopped, and therefore, the fuel consumption of the engine 12 can be suppressed.

In addition, after the execution of the idling stop is started as above described, while the engine is stopped by the idling stop (YES in the step 100), the ECU 22 determines whether or not an execution condition for the idling start enabling the engine 12 to be automatically restarted is satisfied, based on the state detection results obtained by using the sensors etc. 24 and the operation position of the shift lever 16 obtained by using the position sensor 20.

As a result, in the case where it is determined that the execution conditions for the idling start are not satisfied, including that the operation position of the shift lever 16 is at the D range or the P range (YES in the step 102, and step 108), the idling stop continues to be performed to enable the engine 12 to be automatically stopped (step 110). On the other hand, in the case where it is determined that the execution conditions for the idling start are satisfied due to, for example, the operation position of the shift lever 16 is at the N range or the R range (YES in step 104, and YES in step 106), the idling start is performed to enable the engine 12 to be automatically restarted (step 120).

Therefore, according to the present embodiment, during the execution of the idling stop, when the execution condition for the idling start is satisfied, such as when the shift lever 16 is switched from the D range or the P range to the N range or the R range, and so on, the engine 12 can be automatically restarted, thereby it is possible to ensure the vehicle to be smoothly started from the idling stop state.

In addition, during the execution of the above idling stop, when the ECU 22 determines whether or not the execution condition for the idling start is satisfied, especially with respect to the operation position of the shift lever 16, it is determined whether or not the state of being at the N range or the R range has been maintained for a predetermined time T (step 122 and step 124).

Then, in the case where the operation position of the shift lever 16 is maintained at the N range or the R range for the predetermined time T (YES in step 122, and YES in step 124), the engine 12 is restarted (step 120). On the other hand, if the operation position of the shift lever 16 is not maintained at the N range or the R range for the predetermined time T (No in step 122, and NO in step 124), the engine 12 is not restarted and the stop state of the engine continues (step 110).

Accordingly, according to the present embodiment, while the engine is stopped by the idling stop, in the case where the driver operates to switch the operation position of the shift lever 16, for example, from the D range to the P range and so on, and when the operation position of the shift lever 16 only passes by the N range and the R range, it is possible to prevent the engine 12 from being mistakenly restarted due to the idling start.

In addition, in the present embodiment, the above predetermined time T, which is used when the engine 12 of the vehicle is switched from the idling stop to the idling start and for which the operation position of the shift lever 16 should be maintained at the N range or the R range, is varied according to whether or not the driver has the intention to start the host vehicle from the idling stop state. In particularly, if the driver does not have the intention to start the vehicle, the above predetermined time T is set as a normal time A (e.g. 800 ms). On the other hand, if the driver has the intention to start the vehicle, the above predetermined time T is set as a time shorter than the above normal time A.

When the operation position of the shift lever 16 is switched from the D range to the N range in the idling stop state and in a situation where the vehicle is largely steered or the hazard warning lamp is in illumination, it can be determined that the driver has the intention, with a view to park the vehicle, to start the vehicle so that the host vehicle moves forward or backward. In addition, when the operation position of the shift lever 16 is maintained at the D range for a very short time in the idling stop state, it can be determined that the driver expects the host vehicle to be started immediately against the idling stop by switching the operation position of the shift lever 16. In addition, to the contrary, when the operation position of the shift lever 16 is maintained at the D range for a very long time in the idling stop state, it can be determined that the driver does not have the intention to park the vehicle, but want to start the host vehicle by switching the operation position of the shift lever 16.

Therefore, in the present embodiment, when determining whether or not the condition for the idling start is satisfied during the execution of the idling stop, the ECU 22 respectively determines, based on the signals from the sensors etc. 24, whether or not the hazard warning lamp switch is turned on, whether or not the steering angle from a neutral position becomes a predetermined threshold Y1 or above, whether or not the steering torque becomes a predetermined threshold Y2 or above, whether or not the stay time for which the operation position of the shift lever 16 is maintained at the D range since the start of the execution of the idling stop is below a predetermined threshold time X1 or becomes a threshold time X2 or above, as the determination on whether or not the driver has the intention to start the vehicle.

In addition, it is sufficient that the determination is made after the execution of the idling stop is started; for example, it can be made at a timing that the operation position of the shift lever 16 is switched from the idling stop state to the N range or the R range at which the restart of the engine is enabled. In addition, the above predetermined thresholds Y1, Y2 and the threshold times X1, X2 are respectively values which are set beforehand so as to be used to confirm whether or not the driver has the intention to start the vehicle. In addition, the threshold time X1 and the threshold time X2 satisfy a relationship of X1<X2. For example, the threshold time X1 may be about 2 to 3 seconds and the like, and the threshold time X2 may be about 30 seconds and the like.

When the ECU 22 determines that the hazard warning lamp switch is not turned on, the steering angle is smaller than the predetermined threshold Y1, and the steering torque is smaller than the predetermined threshold Y2, and hence determines that the stay time for which the operation position of the shift lever 16 is maintained at the D range is equal to or above the threshold time X1 and below the time X2, it is provided that the driver's intention to start the vehicle cannot be confirmed in the idling stop state, and the above predetermined time T used to switch the engine 12 of the vehicle from the idling stop to the idling start is set as the normal time A.

In addition, when the ECU 22 determines that the hazard warning lamp switch is turned on, the steering angle is equal to or larger than the predetermined threshold Y1, or the steering torque is equal to or larger than the predetermined threshold Y2, it is provided that the driver's intention to start the vehicle can be confirmed in the idling stop state, and the above predetermined time T is set as zero which is shorter than the normal time A. In addition, when it is determined that the stay time for which the operation position of the shift lever 16 is maintained at the D range is below the threshold time X1 or becomes the threshold time X2 or above, it is provided that the driver's intention to start the vehicle can be confirmed in the idling stop state, and the above predetermined time T is set as a time B (<A) which is shorter than the normal time A.

Furthermore, it is sufficient to perform the setting of the above predetermined time T after the execution of the idling stop is started; for example, it can be performed at a timing when the operation position of the shift lever 16 is switched from the idling stop state to the N range or the R range enabling the restart of the engine. In addition, in the case where a plurality of conditions by which the driver's intention to start the vehicle can be confirmed in the idling stop state are also satisfied and the respective predetermined times T for these conditions are differently set, the predetermined time T can be set as a shorter time in consideration of the start response, and the predetermined time T can also be set as a longer time instead in consideration of the control stableness.

In addition, the predetermined time T (hereinafter, referred to as determination time for N range TN) used when the operation position of the shift lever 16 is maintained at the N range and the predetermined time T (hereinafter, referred to as determination time for R range TR) used when the operation position of the shift lever 16 is maintained at the R range can be respectively set at different timings after the execution of the idling stop is started (step 126 and step 128), and can also be set at the same timing as well.

The ECU 22 determines, on the basis of the predetermined time T set as mentioned above, whether or not the above conditions for idling start are satisfied (step 122 and step 124). Then, in the case where the operation position of the shift lever 16 is maintained at the N range or the R range for the predetermined time T, the idling start is performed to enable the engine 12 to be restarted (step 120).

For example, when at the idling stop state, and the operation position of the shift lever 16 is switched from the D range to the N range in a situation that the vehicle is largely steered or the hazard warning lamp is in illumination, the above determination time for N range TN is set as zero, and therefore, it can be confirmed that the driver has the intention to start the vehicle, and the engine 12 is restarted immediately by the idling start. In addition, when at the idling stop state and the stay time for which the operation position of the shift lever 16 is maintained at the D range is below the threshold time X1, the above determination time for N range TN and the above determination time for R range TR are set as the time B, and therefore, it is provided that the driver has the intention to start the vehicle at the timing at which a state of the operation position of the shift lever 16 being maintained at the N range or the R range lasts for the time B, and the engine 12 is restarted by the idling start.

In this way, with the automatic control apparatus 10 for an engine according to the present embodiment, it is possible to vary the above predetermined time T (i.e. the determination time for N range TN and the determination time for R range TR) which is used when the engine 12 of the vehicle is switched from the idling stop to the idling start and for which the operation position of the shift lever 16 should be maintained at the N range or the R range, according to whether or not the driver has the intention to start the vehicle from the idling stop state. In particularly, the predetermined time is normally set as the time A, and on the other hand, when the operation position of the shift lever 16 becomes the N range, in the case where the hazard warning lamp is in illumination and/or in the case where the vehicle is largely steered, the predetermined time is set as zero which is shorter than the above normal time A. In addition, if the operation position of the shift lever 16 is maintained at the D range for a stay time longer than the threshold time X2, the predetermined time is set as a time B shorter than the above normal time A.

If the determination time for N range TN and the determination time for R range TR are set to be shorter when the driver has the intention to start the vehicle during the execution of the idling stop than the determination time for N range TN and the determination time for R range TR when there is no intention to start the vehicle, the period from the operation position of the shift lever 16 being switched to the N range or the R range until the engine 12 of the vehicle being restarted by the idling start becomes shorter in the case where the driver has the intention to start the vehicle than when there is no intention to start the vehicle. Accordingly, in the case where the driver starts the host vehicle from the idling stop state to park the vehicle, and the like, it is possible to suppress the feeling that the vehicle has a poor start response. Therefore, according to the present embodiment, the engine 12 which has been stopped by the idling stop can be appropriately restarted by means of the idling start in compliance with the driver's intention to start the vehicle.

Furthermore, in the above embodiment, the D range and the P range of the shift lever 16 are examples of the "first specific range" as recited in the claims, the N range and the R range are examples of the "second specific range" as recited in the claims, the ECU 22 detecting the operation position of the shift lever 16 based on the signals from the sensors etc. 24 is an example of the "operation position detection portion" as recited in the claims, the ECU 22 performing the idling stop and then performing the idling start according to the preset conditions is an example of the "idling stop control portion" as recited in the claims, the ECU 22 determining whether or not the driver has the intention to start the vehicle based on the signals from the sensors etc. 24 is an example of the "start intention determination portion" as recited in the claims, and the ECU 22 varying the determination time for N range TN and the determination time for R range TR according to the presence/absence of the driver's intention to start the vehicle is an example of the "time variation portion" as recited in the claims.

In the above embodiment, whether or not the hazard warning lamp being in illumination, the steering angle, the steering torque, and the stay time at the D range are used as the parameters for determining whether or not the driver has the intention to start the vehicle in the idling stop state. However, the present invention is not limited thereto, and instead of or in addition to them, whether or not the parking brake is operated can be used. That is, based on the signals from the sensors etc. 24, the ECU 22 determines whether or not the parking brake switch is switched on, as the determination on whether or not the driver has the intention to start the vehicle. Then, when the parking brake switch is switched off, it is provided that there is an intention to start the vehicle, and the above predetermined time T is set as the normal time A; on the other hand, when the parking brake switch is switched on, it is provided that there is no intention to start the vehicle, and the above predetermined time T is set as a time C (>A) longer than the normal time A.

In this variation, in the case where the driver does not have the intention to start the vehicle, compared with the case where the driver has the intention to start the vehicle, the period from the operation position of the shift lever 16 being switched to the N range or the R range until the engine 12 of the vehicle being restarted by means of the idling start is also prolonged, and therefore, the engine 12 which has been stopped by the idling stop can be restarted appropriately by means of the idling start in compliance with the driver's start intention.

In addition, in the above embodiment, whether or not the hazard warning lamp being in illumination, the steering angle, the steering torque, and the stay time at the D range are all used as the parameters for determining whether or not the driver has the intention to start the vehicle in the idling stop state. However, the present invention is not limited thereto, and it is sufficient as long as any one of these parameters is included.

In addition, in the above embodiment, the determination time for N range TN and the determination time for R range TR is variable according to whether or not the driver has the intention to start the vehicle in the idling stop state. However, it is also possible to vary the determination time for N range TN and the determination time for R range TR according to the operation speed of the shift lever 16. For example, after the execution of the idling stop is started in a situation where the operation position of the shift lever 16 is at the D range, according to the time from the operation position of the shift lever 16 being switched from the D range to the N range until being switched from the N range to the R range (hereinafter, referred to as N range lapsed time z1), the determination time for N range TN is fixed as the normal time A, and at the same time, the determination time for R range TR is made to be variable (for example, being set as a value obtained by adding a minor fixed value α to the N range lapsed time z1). In addition, to the contrary, after the execution of the idling stop is started in a situation where the operation position of the shift lever 16 is at the P range, according to the time from the operation position of the shift lever 16 being switched from the P range to the R range until being switched from the R range to the N range (hereinafter, referred to as R range lapsed time z2), the determination time for R range TR is fixed as the normal time A, and at the same time, the determination time for N range TN is made to be variable (for example, being set as a value obtained by adding a minor fixed value α to the R range lapsed time z2).

In this variation, in compliance with the driving habit of each driver on the shift lever 16, and the like, the determination time for N range TN or the determination time for R range TR can be varied. Therefore, the engine 12 which has been stopped by the idling stop can be restarted appropriately by means of the idling start in compliance with the driver's intention or the driver's operation on the shift lever 16. In addition, if the determination time for R range TR is set as a value obtained by adding a minor fixed value α to the N range lapsed time z1, even the operation speed of the gear shifting when passing the R range is slightly slower than operation speed of the gear shifting when passing the N range while the operation position of the shift lever 16 is switched from the D range to the P range, it is still possible to suppress a situation that the engine 12 is restarted against the driver's intention. Likewise, if the determination time for N range TN is set as a value obtained by adding a minor fixed value α to the R range lapsed time z2, even the operation speed of the gear shifting when passing the N range is slightly slower than operation speed of the gear shifting when passing the R range while the operation position of the shift lever 16 is switched from the P range to the D range, it is still possible to suppress a situation that the engine 12 is restarted against the driver's intention.

Moreover, in the above embodiment, the operation positions of the shift lever 16 are arranged in the order of the P range, the R range, the N range, the D range, the 2nd range and the 1st range of the six ranges. However, the present invention is not limited thereto, and it is sufficient as long as the arrangement sequence of all the operation positions of the shift lever 16 is set such that the shift ranges for which the idling start is executable are interposed between two shift ranges for which the idling stop is executable.

For example, in the above embodiment, the N range and the R range provided between the D range and the P range, which are set as the operation positions as one of the execution conditions for the idling stop, are both set as the operation positions as one of the execution conditions for the idling start. However, the present invention is not limited thereto, and if the R range is set as the operation position as one of the execution conditions for the idling start, the N range may also be set as the operation position as one of the execution conditions for the idling stop.

The invention claimed is:

1. An automatic control apparatus for an engine, comprising:
    an operation position detection portion that is equipped on a vehicle with a mechanical shift lever, which is operated by a driver to switch shift stages of a transmission between a plurality of shift ranges, to detect an operation position of the mechanical shift lever;
    an idling stop control portion that performs an idling stop function to automatically stop the engine when a predetermined condition is satisfied in the case where the operation position of the mechanical shift lever is located at a first specific range as a part of all the shift ranges, and that performs an idling start function to automatically restart the engine in the case where, after the operation position of the mechanical shift lever is switched from the first specific range to a second specific range different from the first specific range while the engine is stopped by the idling stop function, the operation position of the mechanical shift lever is maintained at the second specific range for a predetermined time;
    a start intention determination portion that determines whether or not the driver has an intention to start the vehicle when the operation position of the mechanical shift lever is switched from the first specific range to the second specific range while the engine is stopped by the idling stop function; and
    a time variation portion that sets the predetermined time to be shorter in the case where the start intention determination portion determines that the driver has the intention to start the vehicle than when it is determined that there is no intention to start the vehicle, wherein
    the start intention determination portion determines whether or not the driver has the intention to start the vehicle based on whether or not a hazard warning lamp switch is turned on, whether or not a steering operation of a predetermined amount or above is performed, or whether or not a parking brake is operated.

2. The automatic control apparatus for an engine according to claim 1, wherein
    in the case where the hazard warning lamp switch is turned on, in the case where the steering operation of the predetermined amount or above is preformed, or in the case where the parking brake is not operated, the start intention determination portion determines that the driver has the intention to start the vehicle; on the other hand, in the case where the hazard warning lamp switch is not turned on, in the case where no steering operation of the predetermined amount or above is performed, or in the case where the parking brake is operated, the start intention determination portion determines that the driver does not have the intention to start the vehicle.

3. The automatic control apparatus for an engine according to claim 1, wherein
    the start intention determination portion determines whether or not the driver has the intention to start the vehicle based on whether or not a period for which the operation position of the mechanical shift lever is maintained at the first specific range after the execution of the idling stop function is started is a predetermined threshold or above.

4. The automatic control apparatus for an engine according to claim 1, wherein
    among all the shift ranges, there are two or more the first specific ranges, and an arrangement sequence of all the operation positions of the mechanical shift lever is set such that the second specific range is interposed between two of the first specific ranges.

5. An automatic control apparatus for an engine, comprising:
    an operation position detection portion that is equipped on a vehicle with a mechanical shift lever, which is operated by a driver to switch shift stages of a transmission between a plurality of shift ranges, to detect an operation position of the mechanical shift lever;
    an idling stop control portion that performs an idling stop function to automatically stop the engine when a predetermined condition is satisfied in the case where the operation position of the mechanical shift lever is located at a first specific range as a part of all the shift ranges, and that performs an idling start function to automatically restart the engine in the case where, after the operation position of the mechanical shift lever is switched from the first specific range to a second specific range different from the first specific range while the engine is stopped by the idling stop function, the operation position of the mechanical shift lever is maintained at the second specific range for a predetermined time;
    an operation speed detection portion that detects an operation speed of the mechanical shift lever when the operation position of the mechanical shift lever is switched from the first specific range to the second specific range while the engine is stopped by the idling stop function; and
    a time variation portion that varies the predetermined time according to the operation speed detected by the operation speed detection portion.

6. The automatic control apparatus for an engine according to claim 5, wherein
    among all the shift ranges, there are two or more the first specific ranges, and an arrangement sequence of all the operation positions of the mechanical shift lever is set such that the second specific range is interposed between two of the first specific ranges.

7. An automatic control apparatus for an engine, comprising:
    an operation position sensor that is equipped on a vehicle with a mechanical shift lever, which is operated by a driver to switch shift stages of a transmission between a plurality of shift ranges, to detect an operation position of the mechanical shift lever; and
    an electronic control unit (ECU) configured to:
    perform an idling stop function to automatically stop the engine when a predetermined condition is satisfied in the case where the operation position of the mechanical shift lever is located at a first specific range as a part of all the shift ranges;
    perform an idling start function to automatically restart the engine in the case where, after the operation position of the mechanical shift lever is switched from the first specific range to a second specific range different from the first specific range while the engine is stopped by the idling stop function, the operation position of the mechanical shift lever is maintained at the second specific range for a predetermined time;
    determine whether or not the driver has an intention to start the vehicle when the operation position of the mechanical shift lever is switched from the first specific range to the second specific range while the engine is stopped by the idling stop function;

set the predetermined time to be shorter in the case where the start intention determination portion determines that the driver has the intention to start the vehicle than when it is determined that there is no intention to start the vehicle; and determine whether or not the driver has the intention to start the vehicle based on whether or not a hazard warning lamp switch is turned on, whether or not a steering operation of a predetermined amount or above is performed, or whether or not a parking brake is operated.

\* \* \* \* \*